United States Patent [19]
Ytterberg et al.

[11] Patent Number: 5,859,783
[45] Date of Patent: Jan. 12, 1999

[54] METHOD AND APPARATUS FOR MEASURING FLATNESS OF A FLOOR

[75] Inventors: Robert F. Ytterberg, Evergreen; Krag Wheeler, Ltttn, both of Colo.

[73] Assignee: Ytterberg Scientific Inc., Bonita Springs, Fla.

[21] Appl. No.: 583,282

[22] Filed: Jan. 5, 1996

[51] Int. Cl.$^6$ .................................................. G01B 7/28
[52] U.S. Cl. ............................ 364/559; 33/533; 33/1 BB
[58] Field of Search .................................... 364/559, 556, 364/560, 449; 33/533, 526, 227, 297, 331–332, 1 BB, 366, 504; 73/146; 342/357; 212/280, 276

[56] References Cited

U.S. PATENT DOCUMENTS

| | | |
|---|---|---|
| 811,739 | 2/1906 | Biddle . |
| 1,829,257 | 10/1931 | Best et al. . |
| 1,967,758 | 7/1934 | Pierce . |
| 2,316,951 | 4/1943 | Grauer ........................................ 33/32 |
| 2,552,890 | 5/1951 | Eisler ................................. 33/141.5 |
| 3,026,164 | 3/1962 | Lancerini ..................................... 346/8 |
| 3,056,209 | 10/1962 | Oliver ....................................... 33/174 |
| 3,208,151 | 9/1965 | Rawstron .................................. 33/174 |
| 3,222,787 | 12/1965 | Young ......................................... 33/86 |
| 3,459,038 | 8/1969 | Swift ........................................ 73/146 |
| 3,462,845 | 8/1969 | Matthews ..................................... 33/46 |
| 3,470,739 | 10/1969 | Takafuji et al. .......................... 73/159 |
| 3,475,954 | 11/1969 | Cook ........................................ 73/146 |
| 3,639,993 | 2/1972 | Sartorio ................................... 33/174 |
| 3,675,545 | 7/1972 | Anderson et al. ........................... 94/46 |
| 3,797,124 | 3/1974 | Easterling et al. ........................ 33/331 |
| 3,816,937 | 6/1974 | Burgin ..................................... 33/366 |
| 3,835,546 | 9/1974 | Jaquet ..................................... 33/338 |
| 3,887,012 | 6/1975 | Scholl et al. ............................. 172/4.5 |
| 3,896,665 | 7/1975 | Goel ........................................ 73/146 |
| 3,940,855 | 3/1976 | Ver Nooy et al. ....................... 33/174 L |
| 4,133,072 | 1/1979 | Face, Jr. ..................................... 15/353 |
| 4,137,638 | 2/1979 | Watts ..................................... 33/141.5 |
| 4,274,205 | 6/1981 | Starr et al. ............................. 33/174 L |
| 4,434,558 | 3/1984 | Face, Jr. et al. ............................ 33/174 |
| 4,471,530 | 9/1984 | Kirven .................................. 33/174 R |
| 4,473,960 | 10/1984 | Face, Jr. et al. ............................ 33/366 |
| 4,689,892 | 9/1987 | Kirven ..................................... 33/533 |
| 4,748,748 | 6/1988 | Kirven ..................................... 33/533 |
| 4,771,549 | 9/1988 | Shelangoskie et al. ................... 33/533 |
| 5,012,588 | 5/1991 | Face, III ................................. 33/533 |
| 5,129,803 | 7/1992 | Nomura et al. ........................... 425/62 |
| 5,191,713 | 3/1993 | Alger et al. ............................... 33/366 |
| 5,343,739 | 9/1994 | Curry ..................................... 212/280 |
| 5,493,499 | 2/1996 | Theurer et al. ........................ 364/449 |

FOREIGN PATENT DOCUMENTS 1590017  5/1981  United Kingdom .

*Primary Examiner*—James P. Trammell
*Assistant Examiner*—Bryan Bui
*Attorney, Agent, or Firm*—Stetina Brunda Garred & Brucker

[57] ABSTRACT

In a method for measuring the flatness of a floor with an inclinometer, the relative elevation of the floor is determined at the beginning and end of a survey line, and then a plurality of inclinometer measurements in one direction along the survey line are performed. The difference in relative elevation at the beginning of the survey line and the end of the survey line is then used so as to correct for accumulated offset errors in the inclinometer measurements. The use of such elevation differences to correct the accumulated offset errors in the inclinometer measurements eliminates the need to perform inclinometer measurements in a reverse direction, and thereby reduces time required for the performance of such measurements. The accuracy of the device is improved by reducing the distance between measurements and by averaging a plurality of consecutive measurements.

15 Claims, 5 Drawing Sheets

METHOD AND APPARATUS FOR MEASURING FLATNESS OF A FLOOR

FIELD OF THE INVENTION

The present invention relates generally to surface gauges and more particularly to an improved apparatus and methodology for measuring surfaces, e.g., floors, to detect surface irregularities therein. Still more particularly, this invention relates to an apparatus and methodology for improving the accuracy of flatness measurement for concrete floors in order to determine their suitability for use in automated warehouse applications.

BACKGROUND OF THE INVENTION

In recent years, the concrete floor industry has experienced an increasing demand for extremely flat floors (generically known as superflat floors) which are suitable for automated high level warehousing applications. Floor surface height deviations often cause vibrational damage to automated fork and turret trucks traveling upon the floor and also reduce the productivity of stacking cranes installed within the warehouse. Variations in floor height may also adversely affect the ability of automated equipment to locate and retrieve items from their respective storage places within a warehouse. The industry is currently attempting to adopt standards and specifications for floor flatness and is also trying to establish apparatus and methods suitable for measuring floor flatness to ensure compliance with such existing and future standards.

Heretofore, three basic categories of prior art apparatus and methods for measuring floor flatness have been utilized in the art, i.e., manual systems, semi-automatic systems and fully automatic systems.

The manual systems have typically comprised either an engineer's level and rod apparatus or a level straight edge with a sliding dial gauge mounted at right angles to the straight edge. Floor measurements indicated on the rod or from the dial gauge are obtained and then manually plotted.

The more recent semi-automatic systems have generally comprised apparatus having a pair of spaced apart wheels adapted to travel along a selected path upon a concrete floor surface. These systems include a sensor adapted to measure the height differential between the two wheels along the concrete floor. Examples of such prior art semi-automatic systems are the Analog Profileograph apparatus manufactured by Edward W. Face Company and an analog measuring apparatus manufactured by Mr. Ralph McLean of Fullerton, Calif.

Although such prior art manual and semi-automatic measuring systems have proven generally effective in the past, they possess inherent deficiencies which detract from their overall effectiveness and widespread use in the industry. The foremost deficiency of the manual prior art systems has been the extreme labor intensiveness of conducting measurements, often requiring a pair of skilled surveyors to be maintained upon the job site for prolonged durations. Further, such manual systems, although providing a true height reading along the floor surface, have necessitated the accumulation of height readings at only selected locations on the floor surface, with later interpolation of the measurement data to derive a height profile for the entire surface area of the floor. As will be recognized, such interpolation inherently introduces inaccuracies into the measurement results, which in superflat floor applications is oftentimes unacceptable.

The prior art semi-automatic systems, although typically not requiring significant interpolation of data results, have proven to be extremely expensive, and further require skilled operating technicians to be utilized upon the job site. Further, such semi-automatic systems have heretofore failed to provide a true height profile of the floor surface, but rather have only yielded a relative height differential throughout the surface area of the floor. In addition, current semi-automatic devices pose many anomalies associated with the data representation of absolute surface heights and many such systems have failed to provide the slope or level measurements of the floor.

A recent semi-automatic sensor beam device comprises a rigid beam supported upon the measurement surface at opposite ends thereof, and includes means to permit the rapid leveling of the beam into a level horizontal plane or axis. A height sensor is carried for transport along the beam and is adapted to contact the measurement surface. The sensor and transport mechanism generate height and position signals which may be processed by a microprocessor and printed or plotted to yield a true height profile of the measurement surface throughout the length of the beam.

A recent automatic single axis transport trolley device comprises the use of a trolley having a pair of wheels adapted to contact and travel upon the surface to be measured. A pair of optical sensors are mounted upon servo units attached adjacent each of the contact wheels and are adapted to track an optical beam utilized to generate a reference plane, axis or datum. During travel of the trolley along the surface, variations in the surface height from the optical reference plane are detected by the optical sensors which output signals that may be similarly processed to print and plot the true height profile of the measured surface.

A recent automatic dual axis transport trolley apparatus comprises a trolley which may be transported along the length of the surface to be measured and basically combines the structure of the semi-automatic beam sensor and fully automatic single axis embodiments to permit, in a step and repeat fashion, simultaneous sensing, printing, and plotting of the true surface height profile along both a transverse and longitudinal coordinate axis.

It is known to utilize an inclinometer so as to obtain such floor height measurements. The inclinometer provides measurements of the slope of the floor at selected points along a survey line. Measurements from a plurality of generally parallel survey lines are used to construct a profile of relative floor height measurements, so as to define the flatness of the floor.

One such prior art device is disclosed in U.S. Pat. No. 4,748,748 issued on Jun. 7, 1988 to Kirven and entitled, METHOD AND APPARATUS FOR MEASURING HEIGHT VARIATIONS ON A FLOOR SURFACE, the contents of which are hereby incorporated by reference.

However, although such contemporary devices are generally suitable for the intended purpose, they suffer from inherent deficiencies which detract from their overall usefulness and desirability. More particularly, the accuracy of contemporary devices has not heretofore attained a desired level. Further, various procedures have been developed in an attempt to improve the accuracy of such contemporary devices. The practice of these procedures adds to the complexity of the measurement process. Thus, the practice of such procedures substantially increases the time required to complete the measurement process, and is therefore costly and undesirable.

For example, inaccuracies in measurements when using an inclinometer to measure floor flatness occur when the measurement device is first started in motion, or when it is stopped and then restarted during the measurement process. When the measurement device is initially started, or is restarted, the inclinometer experiences acceleration which results in inaccurate measurements provided thereby, i.e., false slope readings due to the inertia of the sensor mass thereof. Similarly, when the measurement device is stopped, i.e., its forward motion is halted, the inclinometer experiences a deceleration which also inherently causes it to provide inaccurate readings. In an attempt to overcome the problem of inaccurate inclinometer readings due to accelerations and decelerations experienced thereby, contemporary practice dictates that the device be brought up to a constant velocity before such measurements are commenced and that any measurements taken when the device is not moving at the desired constant velocity are considered invalid.

Of course, this necessitates that the device be given a head start prior to the survey line defining the region upon which measurements are to be made, and that in the event of stoppage during the measurement process, the device be restarted a sufficient distance behind the stopping point so as to allow it to resume the desired constant velocity prior to continuing the measurement process.

Additionally, offset errors are introduced into the measurement process due to various mechanical inaccuracies inherent in the use of inclinometers and also due to various floor anomalies. Contemporary practice dictates that two runs or sets of measurements be taken, in opposite directions with respect to one another, so as to substantially cancel the effect of such offset errors. As such, a first set of floor height measurements are taken in a first direction along a survey line, and then the measurements are repeated in the opposite direction. Thus, the effects of mechanical deficiencies within the inclinometer, as well as floor anomalies, tend to be of opposite signs and thus cancel each other among the two runs, when the results of each set of measurements are combined.

Further, making two such runs facilitates tying the beginning of the runs to the end thereof so as to further improve measurement accuracy. Tying the beginning of the runs to the end thereof reduces cumulative errors by making the elevation at the beginning of the runs equal to the elevation at the end thereof, since the beginning and end of the runs is at the same location. For example, if we assume that the relative elevation at the beginning of the two runs is zero and that the measured elevation at the end of the two runs, as provided by the inclinometer, is one inch, then one inch of elevation error has clearly accumulated within the device since the beginning and end of the two runs are at the same location. All of the measurements along both the forward and return runs are then altered or normalized proportionally, according to the length of the distance traveled, so as to cause the ending elevation to assume its true value of zero inches of elevation relative to the starting point. Thus, the elevation one quarter of the total distance traveled would be reduced by one quarter of the total accumulated error, which is one quarter of an inch in this example. The elevation measurements taken at all other locations along the two runs are similarly modified, so as to completely eliminate accumulated error. In this manner, accumulated errors tend to be effectively canceled out and more accurate floor height measurements are thus provided.

However, as those skilled in the art will appreciate, the need to make two measurement runs, as opposed to a single run, is inefficient and costly.

As will be appreciated, such contemporary methodology essentially doubles the effort required to obtain an acceptably accurate set of floor height measurements. Thus, it would be beneficial to provide a means for attaining desired measurement accuracy while eliminating the need for making such redundant or double measurements.

Further the accuracy of contemporary devices is limited since such devices generally perform a single measurement approximately every twelve inches. While such a measurement interval has been found to be generally suitable, it does inherently permit the introduction of various inaccuracies. First, the interval of twelve inches is of sufficient length to allow undesirable deviations in floor level to exist between successive measurements.

For example, a dip might exist between two measurement points. The dip may be of sufficient depth so as to be undesirable in a superflat floor. Yet, the dip would go unmeasured since it occurs between measurement points. Such undesirable deviations are undetected according to contemporary methodology, since they occur within the twelve inch measurement interval, i.e., between the points where measurements are actually taken, and are thus not measured. It has been found that unmeasured floor height deviations which occur within the twelve inch interval can be of a sufficient degree so as to have undesirable effects upon equipment utilized in automatic warehouse applications. As such, it is believed that the measurement interval of twelve inches is too long.

Further it has been found that the taking of a single measurement for each measurement interval may provide a misleading indication of the true inclination at or near that point. Such an inaccurate reading may, for example, result when the precise point at which the measurement is made deviates substantially from the average slope in the immediate surrounding area. For example, a bump or dip occurring at the precise location of a measurement would result in a measurement which is not representative of the slope of the floor on either side of the dump or dip. Indeed, the measured slope may differ substantially from the average slope around the point of measurement. It is the average slope which is more representative of the slope of the floor within a particular area. Thus, minor irregularities in the floor surface may result in misleading or inaccurate slope readings when only a single measurement is performed for each measurement interval.

Further, such inaccuracies may result from the presence of dirt or other debris which affects the inclinometer measurement only at that particular measurement point. Such inaccurate measurements may also result from floor vibrations.

As such, it would be desirable to eliminate misleading or inaccurate inclinometer readings caused by such deviations from the average slope, dirt or debris, and/or floor vibration. It would further be desirable to provide a means for enhancing the accuracy of floor height measurements such that deviations intermediate the contemporary twelve inch measurement intervals are accurately and reliably indicated.

In view of the foregoing, it will be appreciated that although contemporary floor flatness measurement apparatus and methodologies have proven generally suitable for their intended purposes, they possess several inherent deficiencies which detract from their overall effectiveness and desirability.

SUMMARY OF THE INVENTION

The present invention specifically addresses and alleviates the above-mentioned deficiencies associated with the prior art. More particularly, the present invention comprises an apparatus and a method for measuring the flatness of a floor, such as the concrete floor of an automated warehouse, with an inclinometer. By practicing the methodology of the present invention, measurement accuracy is substantially enhanced and the time required to perform such measurements is substantially reduced. The apparatus of the present invention provides a convenient and easy to use device for the practice of such new methodology.

The methodology of the present invention comprises the steps of determining a relative elevation of the floor at the beginning and end of a survey line, and then a plurality of inclinometer measurements in only one direction along the survey line are performed. The known relative elevations at the beginning and end of the survey line are used to tie the beginning and end of the survey line together so as to compensate for measurement errors.

That is, the slopes measured by the inclinometer should result in the correct elevation at the end of the survey line. Any deviation between the elevation calculated by the slope measured by the inclinometer and the actual measurement of elevation is then used to correct for accumulated offset errors in the same manner as is done according to contemporary methodology wherein the beginning and end of the survey line are tied together, as discussed in detail above.

Thus, such offset errors are corrected according to the present invention by effectively tieing the beginning and ending points of the measurements to one another, i.e., by determining the relative elevation of the beginning and ending points of the survey line. This is preferably performed by utilizing a built-in laser headlight of the self-propelled inclinometer of the present invention. This is accomplished by first leveling the self-propelled inclinometer, preferably using a three-point leveling plate upon which the self-propelled inclinometer rests. The built-in inclinometer of the device may be utilized to facilitate such leveling. Thus, the operator merely adjusts the three feet or contact points of the leveling plate such that the built-in inclinometer indicates a level condition in any two orthogonal horizontal directions. After the inclinometer is so leveled, the laser headlight thereof is aimed toward a elevation sensor device according to the present invention, which then accurately determines the height or relative elevation of the laser beam incident thereupon. The elevation sensor device is first placed at the beginning of the survey line and an elevation measurement is performed. Then the elevation sensor device is moved to the end of the survey and a second elevation measurement is performed, so as to obtain the difference in elevation of the end of the survey line with respect to the beginning thereof. This difference in elevation, representative of the relative elevations of the beginning and end of the survey line, is then utilized to correct for accumulated offset errors. That is, knowing the relative elevations of the beginning and ending of the survey line allows the beginning and end of the survey line to effectively be tied to one another in the same manner that the beginning and end of a round trip run are tied together according to contemporary methodology.

The laser beam is preferably modulated at a high frequency so as to eliminate interference from extraneous light sources. This is preferably accomplished by modulating the laser at approximately 10 khz and applying a 10 khz by-pass filter to the output of the sensors of the target.

Preferably, the centroid of the laser beam projected upon the target is calculated so as to accurately determine the relative elevation at the beginning of the survey line. The target preferably comprises six one-inch detector arrays aligned vertically. Each detector array preferably has sufficient resolution to facilitate accurate determination of the centroid of the laser beam, so as to precisely define the floor height therewith. Thus, each sensor array may comprise a 1024×1024 array of individual pixels, 16 pixels per inch, for example, so as to assure such resolution. The elevation can, optionally, be typed into the self-propelled inclinometer such that correction of the floor height measurements taken thereby can be corrected within the self-propelled inclinometer itself.

According to the preferred embodiment of the present invention, the inclinometer measurements are performed in a manner which provides substantially enhanced accuracy thereof. These measurements are thus performed by moving the inclinometer forward approximately six inches along the survey line, then taking a plurality, preferably approximately sixteen, of inclinometer measurements while continuing to move the inclinometer forward at a constant velocity, preferably approximately for a distance of one to one and one-half inch, while the measurements are being taken. This measurement travel distance can be easily varied via the use of an electric timing circuit which determines when measurements are taken.

The plurality of the inclinometer measurements are then averaged together so as to obtain a single average inclinometer measurement approximately every six inches along the survey line. The average measurement value is thus stored as the single measurement value for the center point between the beginning and end points of the measurement distance. Thus, minor variations in floor heights which occur over the one to one and one-half inch travel distance are averaged out, so as to provide a more representative floor height value at the point of interest.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
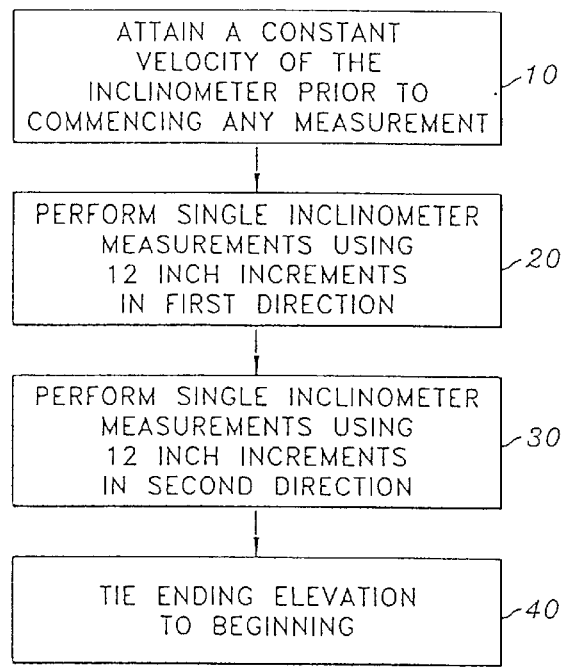
FIG. 1 is a flow chart showing the procedure for floor height measurement utilizing an inclinometer according to contemporary methodology.

The method and apparatus for measuring the flatness of a floor according to the present invention is illustrated in FIGS. 2–10 which depict a presently preferred embodiment of the present invention. FIG. 1 shows the contemporary methodology.

Referring now to FIG. 1, according to contemporary methodology, the flatness of a floor is measured with an inclinometer by attaining a constant velocity 10 of the inclinometer prior to commencing any measurements therewith. Once the self-propelled inclinometer has attained a constant desired velocity, then the measurement process 20 is commenced at the survey line.

The prior art self-propelled inclinometer performs single inclinometer measurements using twelve inch increments between successive measurements in a first direction until the end of the survey line is reached. At the end of the survey line, the self-propelled inclinometer is turned around and the self-propelled inclinometer then performs a second series 30 of single inclinometer measurements using twelve inch increments in the second or opposite direction. The ending elevation is tied to the beginning elevation so as to substantially cancel accumulated offset errors. This is accomplished by setting the ending elevation equal to the beginning elevation and proportionally changing the intermediate elevations, as discussed in detail above.

Figure 2:
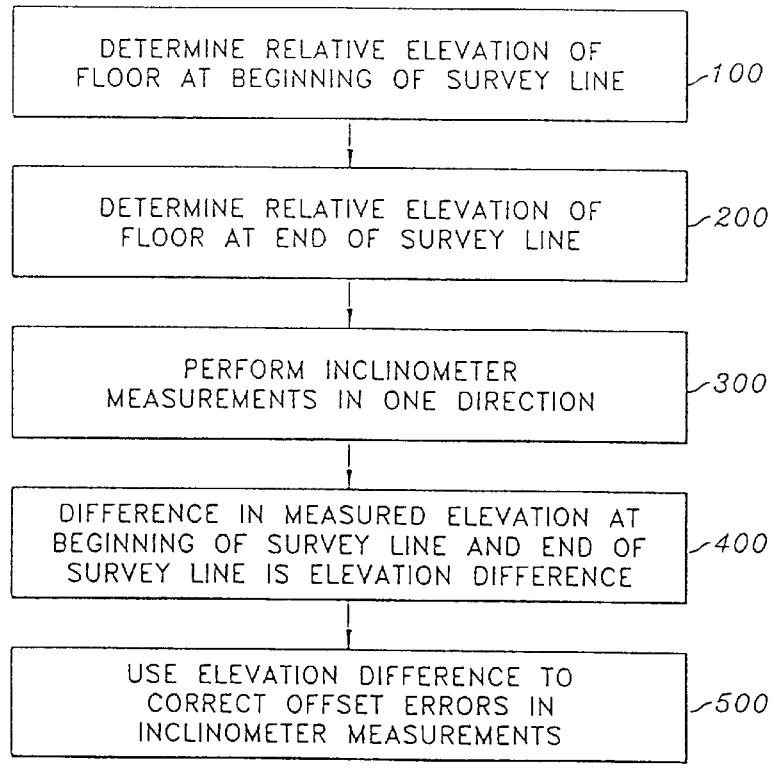
FIG. 2 is a flow chart showing the procedure for floor height measurement utilizing an inclinometer according to the present invention.

Referring now to FIG. 2, according to the methodology of the present invention, the requirement for two different runs in opposite directions is eliminated by determining the relative height of the floor at both the beginning and end of the survey line prior to commencing measurements, and then utilizing these two relative heights to effect corrections to the inclinometer measurements. This provides the same effect as tying the ending and beginning elevations together, since according to both contemporary methodology and the present invention, it is necessary to know the beginning and ending relative elevations in order to effect accumulated offset error correction. In the prior art, returning the self-propelled inclinometer to the starting point accomplishes this, since in the prior art the starting point and the ending point are the same and thus have the same elevation. Thus, according to contemporary methodology, the relative elevations of the starting and ending point are known, i.e., are equal.

More particularly, according to the present invention, the relative elevation of the floor at the beginning of the survey line is determined 100. Next, the relative elevation of the floor at the end of the survey line is determined 200. Inclinometer measurements are performed in only one direction 300. The difference in measured elevation at the beginning of the survey line and the end of the survey line is the elevation difference 400. The elevation difference is used to correct offset errors in the inclinometer measurements 500.

Figure 3:
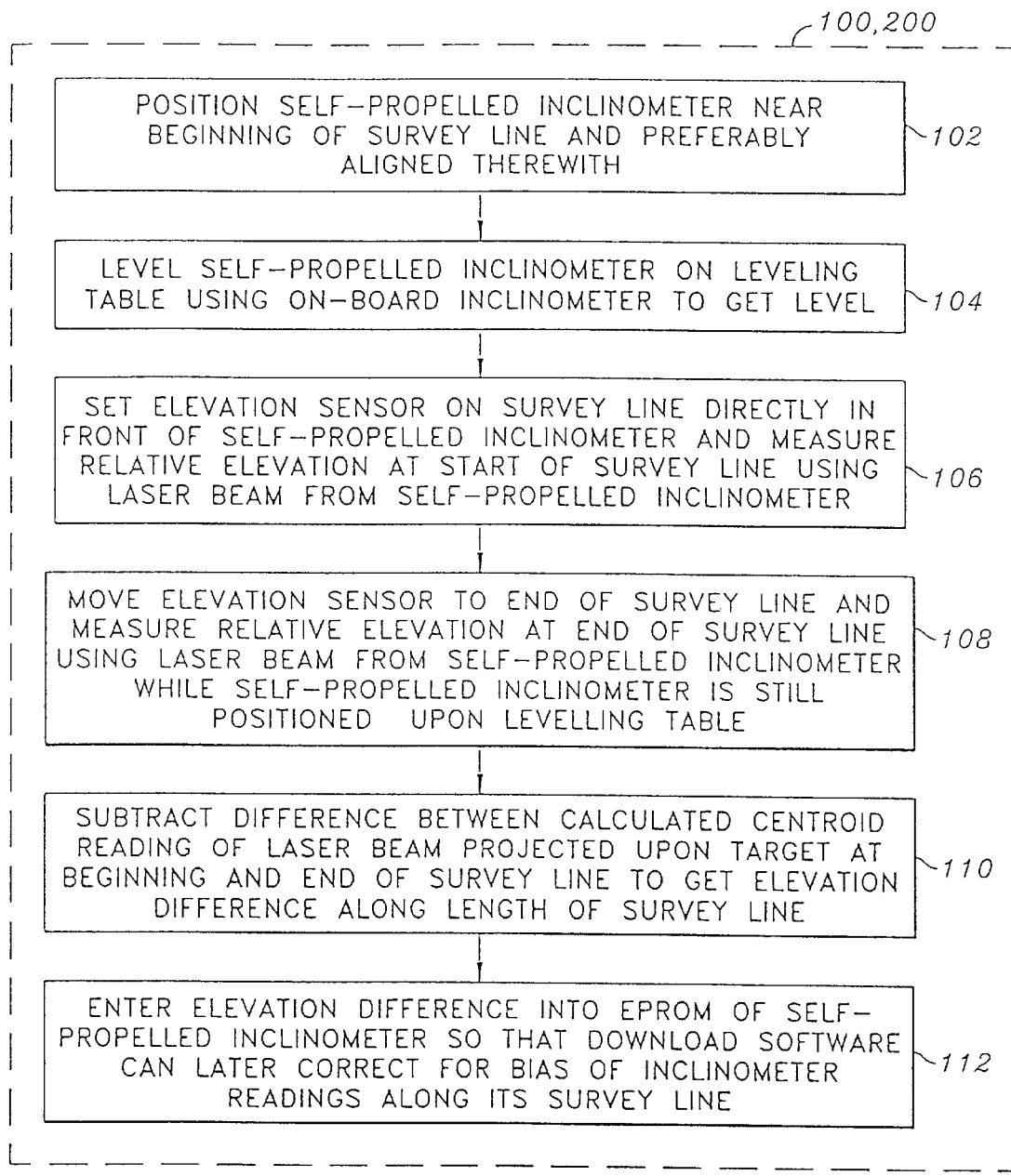
FIG. 3 is a flow chart showing the procedure for determining the elevation difference of the floor at the beginning and end of the survey line.

Referring now to FIG. 3, the process of determining the elevation of the floor at the beginning 100 and end 200 of the survey line comprises positioning the self-propelled inclinometer at the beginning of the survey line 102, leveling the self-propelled inclinometer on a leveling table using the on-board inclinometer of the self-propelled inclinometer 104, and taking elevation readings at the start 106 and end 108 of the survey line utilizing the laser beam projected from the self-propelled inclinometer onto the target. Since the self-propelled inclinometer is maintained in a level condition via the leveling table, the laser beam thereof travels horizontally from the self-propelled inclinometer to the target. Thus, the difference 112 between where the laser beam strikes the target when the target is placed at the beginning of the survey line and when the target is placed at the end of the survey line is equal to the relative difference in elevation between the beginning of the survey line and the end of the survey line. Those skilled in the art will appreciate that the self-propelled inclinometer does not necessarily have to be positioned at the beginning of the survey line, however, it is generally convenient to do so.

Preferably, the centroid of the laser beam projected upon the target is calculated and is considered to be the point at which the laser beam is incident upon the target, so as to more accurately determine the relative elevation at the beginning of the survey line. Since the laser beam inherently diverges somewhat prior to being incident upon the target, it does not define a point suitable for use in accurately determining the floor height at the beginning and end of the survey line. In order to compensate for such divergence of the laser beam, the centroid thereof is calculated so as to define a point which may effectively be used in the accurate determination of such floor heights.

According to the preferred embodiment of the present invention, the elevation difference between the beginning and end of the survey line is entered 112 into an EPROM of the self-propelled inclinometer such that download software can subsequently utilize this difference to correct for accumulated offset error.

Figure 4:
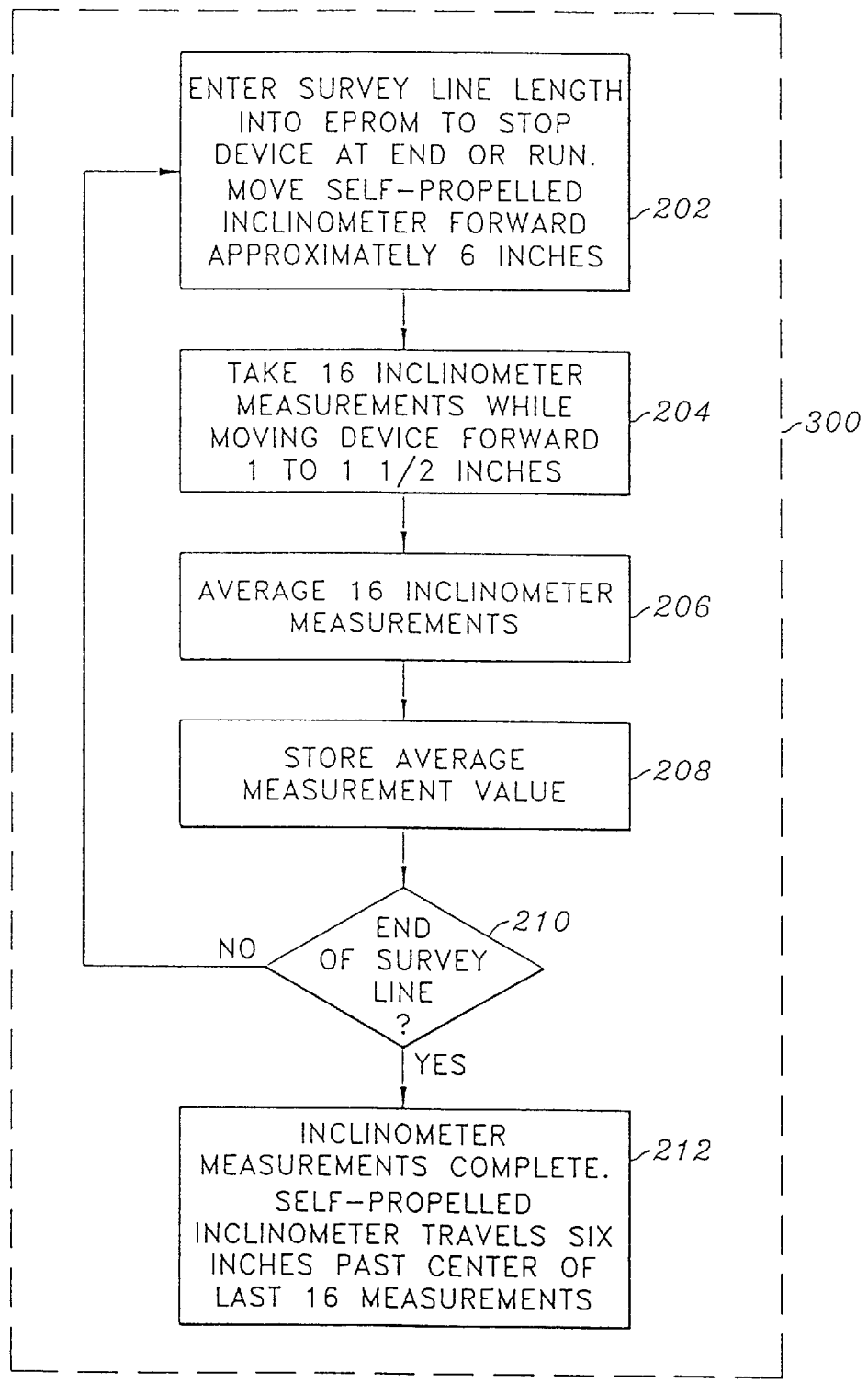
FIG. 4 is a flow chart showing the procedure for performing inclinometer measurements along the survey line.

Referring now to FIG. 4, the process of performing inclinometer measurements in a single direction 300, comprises first entering survey line length into an EPROM contained within the self-propelled inclinometer so as to automatically stop device at end of run; and then moving the self-propelled inclinometer forward approximately six inches 202, and taking approximately sixteen inclinometer measurements while continuing to move the device forward approximately one to one and one-half inches 204 at a constant velocity. The sixteen inclinometer measurements are averaged together 206 to effectively provide a single inclinometer measurement approximately every six inches. The average measurement value is stored 208 for later display, printing, or retrieval. This measurement process is repeated until the end of the survey line is reached. When the end of the survey line 210 is reached, inclinometer measurements are complete 212, but the self-propelled inclinometer travels six inches further before stopping. Averaging inclination measurements reduces errors due to roughness or irregularities in the floor surface and also due to incorrect inclinometer readings caused by vibration of the floor.

Figure 5:
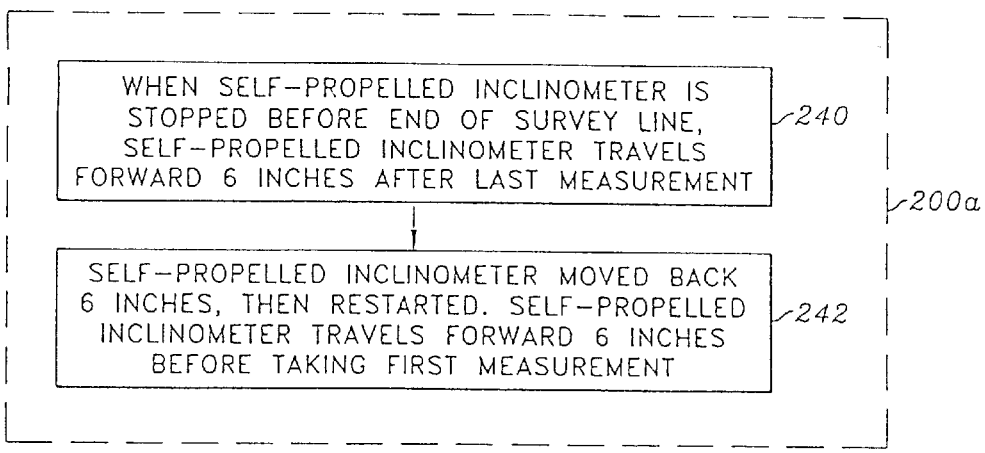
FIG. 5 is a flow chart showing the procedure for stopping and restarting the self-propelled inclinometer.

Referring now to FIG. 5, the procedure for restarting 200a the self-propelled inclinometer of the present invention is shown. This procedure may be utilized when the self-propelled inclinometer has been purposely stopped along the survey line and must subsequently be restarted so as to complete floor height measurements. After being commanded to stop, the self-propelled inclinometer must be backed up a sufficient distance to allow it to attain a constant velocity prior to restarting floor height measurements. Thus, when the self-propelled inclinometer is stopped before the end of the survey line, the self-propelled inclinometer travels forward six inches after the last measurement before halting its forward motion 240, then, prior to resuming forward motion, the self-propelled inclinometer must be moved backwards six inches and then restarted. The self-propelled inclinometer travels forward six inches before taking the first slope measurement 242, so as to assure that a constant velocity has been attained.

Figure 6:
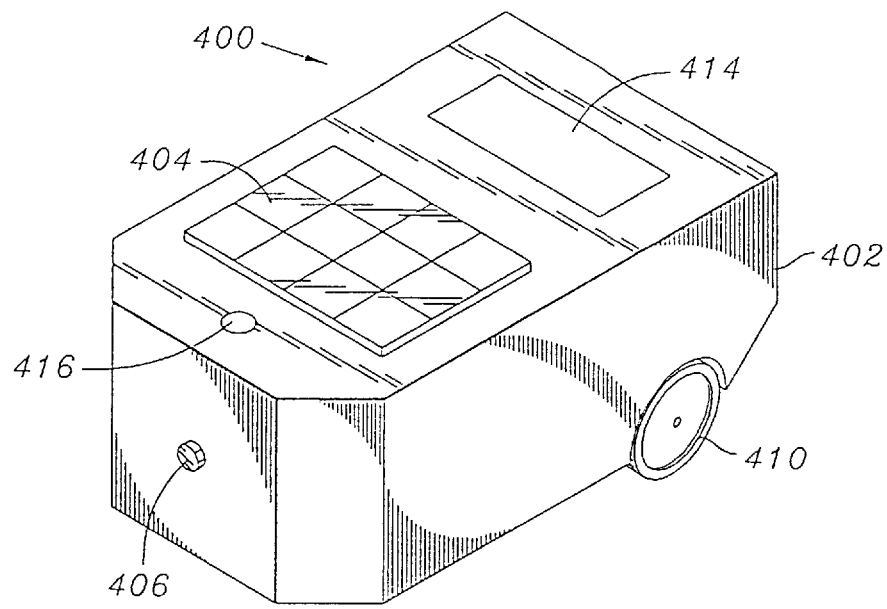
FIG. 6 is a perspective view of the self-propelled inclinometer for measuring the flatness of a floor according to the present invention.
Figure 7:
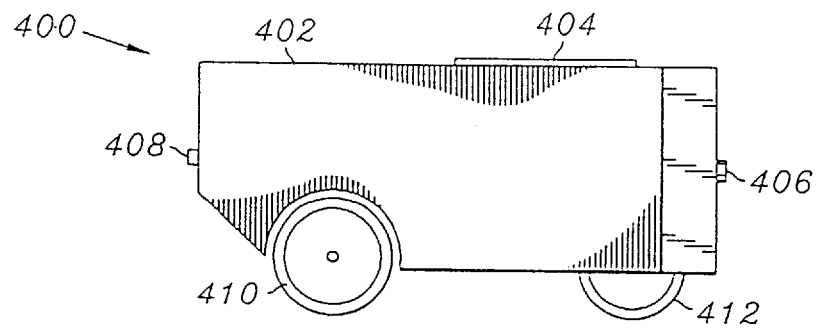
FIG. 7 is a side view of the self-propelled inclinometer of FIG. 6.

Referring now to FIGS. 6 and 7, a preferred embodiment of the self-propelled inclinometer of the present invention is shown. The self-propelled inclinometer 400 comprises a body 402 having two separate nine inch circumference motor driven rear wheels 410 and a single nine inch circumference articulated front wheel 412 to facilitate steering thereof. A keypad 404 is preferably disposed atop the body 402 so as to facilitate control and data entry. Entries are shown on LCD 414, which provides the user with menu driven directions. An electrical connector, preferably an RS-232 connector 408, is formed upon the housing 402, preferably at the rear thereof, so as to facilitate electrical communication with a personal computer, such as an IBM PC, XT, AT, etc.

According to the preferred embodiment of the present invention, an optical detector is utilized to take position readings from radial slots at 120°degree intervals cut into an internal sensor wheel attached to the front axle of the self-propelled inclinometer so as to accurately provide a measurement of the distance traveled thereby. Optionally, readings may be taken at three, six, nine, and twelve inch lengths along the survey line by modification to the EPROM software. The optical detector uses an LED to direct light to the wheel, such that light travels through the slots in the sensor wheel to permit measurements at any multiple of three inches.

According to the preferred embodiment of the present invention, stainless steel wheels are utilized so as to resist wear and corrosion. Such stainless steel wheels also maintain sufficient dimensional stability so as to provide the desired degree of accuracy in floor height measurements. Optionally, the wheels may be neoprene coated and/or comprise tread, so as to improve the traction thereof. The wheels are also preferably turned rather than milled, so as to improve the uniformity of the radius thereof and thereby enhance the accuracy of floor height measurements. The wheels are also preferably hardened so as to further resist wear.

The motor drive circuit is configured so as to provide electrical isolation from the microprocessor and thus mitigate the introduction of motor noise thereinto. Preferably, a sleep circuit maintains power to memory circuitry, so as to prevent accidental loss of measurement data. Power is supplied to the memory circuitry via separate backup batteries in the event that the main motor batteries are discharged.

A laser generating device 406 connected in series with an LED 416 is preferably formed at the front end of the housing 402. This laser may be utilized to facilitate relative elevation measurements at the beginning and end of the survey line. Alternatively, a target may be formed upon the housing 402 and an external laser may be utilized to facilitate relative elevation measurements.

As those skilled in the art will appreciate, various different methods may be utilized to assure that the self-propelled inclinometer of the present invention travels in a substantially straight path along the survey line. For example, sensors formed upon the housing 402 may be utilized to sense the presence of a laser beam, preferably the centroid thereof, so as to facilitate control of the articulated front wheel 412 in a manner which causes the device to follow the laser beam. Alternatively, the laser generating device 406 of the self-propelled inclinometer may be utilized to project upon a sensor disposed at the end of the survey line so as to indicate deviations in travel away from the survey line. These deviations may then be transmitted back to the self-propelled inclinometer via various means, e.g., radio, IR, optical, etc., so as to facilitate control of the self-propelled inclinometer and thereby maintain its desired travel along the survey line. Other means such as strings, chalk lines, tracks, etc., may similarly be utilized.

Alternatively, the self-propelled inclinometer may be configured so as to operate without steering control. That is, the wheels of the self-propelled inclinometer are locked in position so as to assure substantially straight travel of the self-propelled inclinometer. The laser 406 of self-propelled inclinometer is then aimed at a reflective target at the end of the survey line and then allowed to run therealong. If an undesirable deviation in the path traveled by the self-propelled inclinometer occurs, then the self-propelled inclinometer is commanded to stop and is re-aligned with the survey line. It is possible to tap the self-propelled inclinometer as it travels along the survey line, so as to correct undesirable deviations in the path traveled thereby.

Thus, the present invention provides an apparatus and methodology for measuring floor flatness which has improved accuracy and reduced costs associated therewith. Manual operations, e.g., the manual reading of an inclinometer or optical level, etc., are reduced so as to increase the efficiency and accuracy of the measurement procedure. Human error is substantially eliminated via such automation.

Figure 8:
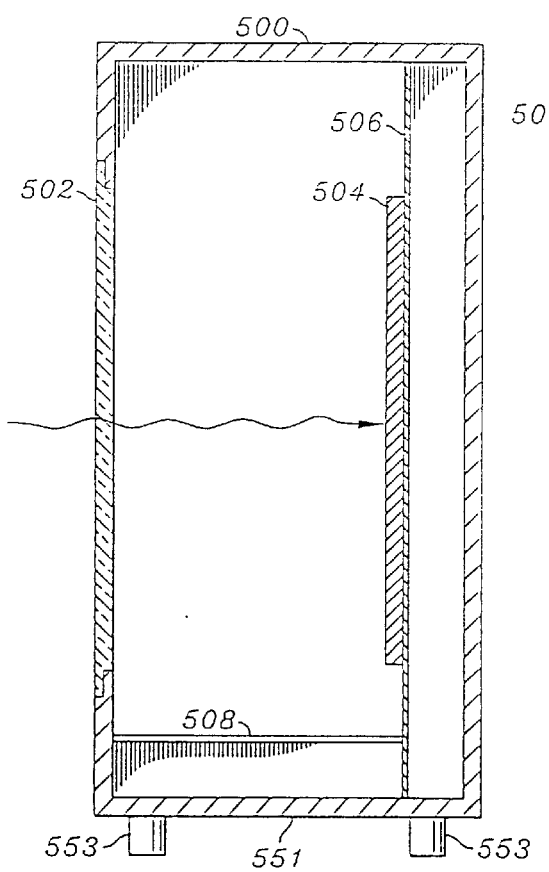
FIG. 8 is a perspective view of the laser centroiding elevation sensor device of the present invention.
Figure 9:
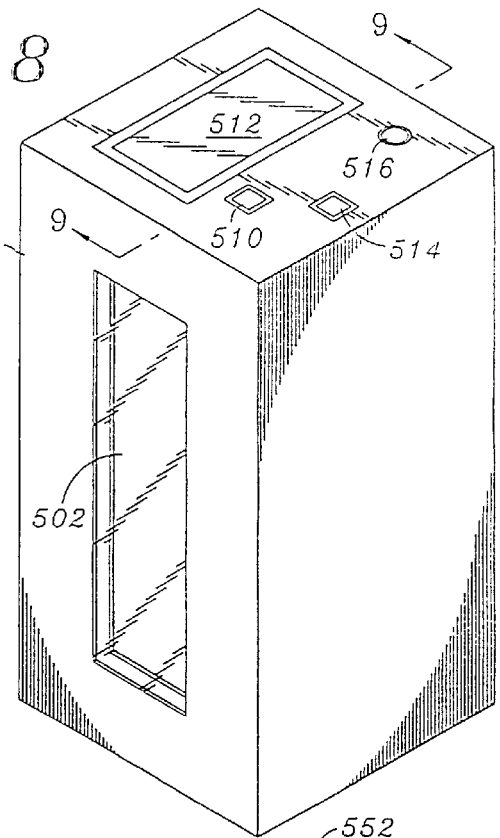
FIG. 9 is a cross-sectional side view of the laser centroiding elevation sensor device taken along lines 9 of FIG. 8.

Referring now to FIGS. 8 and 9, the laser centroiding elevation sensor device preferably comprises a housing 500 having an LCD display 512 formed thereon, for providing operating instructions to the user. An on/off switch 514 provides power to the device and push-button switch 510 is utilized to confirm receipt of the laser beam. A buzzer and LED 516 indicate that the laser beam is being received by the laser centroiding elevation sensor device. A window 502, preferably approximately six inches in height, provides an opening through which the laser beam passes to be incident upon the six inch high detector array 504 housed within the device. The six inch high detector array 504 is mounted upon circuit board 506. Electronics for operating the device are formed upon printed circuit board 508. The base plate 551 of the elevation sensing device preferably has three fixed feet 553.

Figure 10:
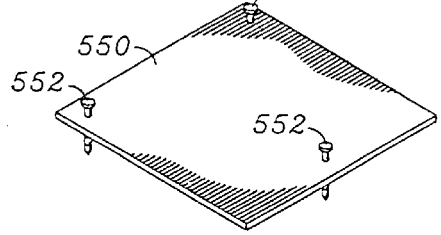
FIG. 10 is a perspective view of a leveling plate used to level the self-propelled inclinometer of the present invention so as to facilitate its use in performing relative elevation measurements.

Referring now to FIG. 10, a leveling table 550 is preferably utilized to level the self-propelled inclinometer so that it may be used to determine the relative elevations of the beginning and end of the survey line, as discussed in detail above. As those skilled in the art will appreciate, the leveling table is utilized by turning leveling screws 552 until a level condition is indicated. According to the preferred embodiment of the present invention, a level condition is indicated utilizing the on-board inclinometer of the self-propelled inclinometer of the present invention.

It is understood that the exemplary method and device for measuring flatness of a floor with an inclinometer described herein and shown in the drawings represents only a presently preferred embodiment of the invention. Indeed, various modifications and additions may be made to such embodiment without departing from the spirit and scope of the invention. For example, a radio link may be utilized to facilitate control of the self-propelled inclinometer, so as to effect stopping thereof without necessitating that controls formed thereon be manipulated. Thus, these and other modifications and additions may be obvious to those skilled in the art, may be implemented to adapt the present invention for use in a variety of different applications.

What is claimed is:

1. A method for measuring flatness of a floor with an inclinometer, said method comprising the steps of:
    a) determining relative elevations of the floor at a beginning and end of a survey line to provide an elevation difference;
    b) performing a plurality of inclinometer measurements while moving an inclinometer in one direction along the survey line;
    c) using the elevation difference to correct offset errors in the inclinometer measurements; and
    d) wherein when the inclinometer is stopped prior to completing the inclinometer measurements, then the inclinometer is backed up a sufficient distance to allow it to attain a constant velocity prior to resuming inclinometer measurements and wherein the use of the elevation difference to correct offset errors in the inclinometer measurements eliminates the need to perform inclinometer measurements in a reverse direction.

2. The method as recited in claim 1 wherein the step of determining the relative elevations of the floor at the beginning and end of the survey line comprises the steps of:
    a) positioning the inclinometer proximate the beginning of the survey line;
    b) leveling the inclinometer;
    c) positioning a target at the beginning of the survey line;
    d) directing a laser beam horizontally from the inclinometer to the target;
    e) calculating the centroid of the laser beam projected upon the target to determine the relative elevation of the floor at the beginning of the survey line;
    f) positioning the target at the end of the survey line;
    g) directing the laser beam horizontally from the inclinometer to the target;
    h) calculating the centroid of the laser beam projected up the target to determine the elevation of the floor at the end of the survey line; and
    i) calculating the difference between the relative height of the floor at the beginning of the survey line and the end of the survey line.

3. The method as recited in claim 1 wherein the step of performing a plurality of inclinometer measurements comprises:
    a) moving the inclinometer forward approximately six inches along the survey line;
    b) taking a plurality of inclinometer measurements while continuing to move the inclinometer;
    c) averaging the inclinometer measurements;
    d) storing the average inclinometer measurement value; and
    e) repeating steps a) through d) until the end of the survey line is reached.

4. The method as recited in claim 1 wherein the step of performing a plurality of inclinometer measurements comprises performing a plurality of inclinometer measurements via a self-propelled inclinometer.

5. The method as recited in claim 3 wherein the step of taking a plurality of inclinometer measurements while continuing to move the inclinometer comprises taking approximately sixteen inclinometer measurements while moving the inclinometer approximately one to one and one-half inches.

6. A method for enhancing accuracy when measuring flatness of a floor with an inclinometer, said method comprising the steps of:
    a) defining a survey line;
    b) moving the inclinometer forward approximately six inches along the survey line;
    c) taking a plurality of inclinometer measurements while continuing to move the inclinometer;
    d) averaging the inclinometer measurements;
    e) storing the average inclinometer measurement value; and
    f) repeating steps a) through e) until the end of the survey line is reached.

7. The method as recited in claim 6 wherein the step of taking a plurality of inclinometer measurements while continuing to move the inclinometer comprises taking approximately sixteen inclinometer measurements while moving the inclinometer approximately one to one and one-half inches.

8. A device for measuring flatness of a floor, said device comprising:
    a) a self-propelled inclinometer configured to follow a survey line;
    b) a controller for controlling movement of the self-propelled inclinometer and the taking of measurements therewith, so as to effect performance of a plurality of inclinometer measurements;
    c) wherein said controller is configured so as to:
        i) move the inclinometer forward approximately six inches;
        ii) take approximately sixteen inclinometer measurements while moving the inclinometer approximately one to one and one-half inch; and
        iii) average the inclinometer measurements.

9. A method for measuring flatness of a floor with an inclinometer, said method comprising the steps of:
    a) determining relative elevations of the floor at a beginning and end of a survey line to provide an elevation difference, the step of determining the relative elevations of the floor at the beginning and end of the survey line comprising the steps of:
        i) positioning the inclinometer proximate the beginning of the survey line;
        ii) leveling the inclinometer;
        iii) positioning a target at the beginning of the survey line;
        iv) directing a laser beam horizontally from the inclinometer to the target;
        v) calculating the centroid of the laser beam projected upon the target to determine the relative elevation of the floor at the beginning of the survey line;
        vi) positioning the target at the end of the survey line;
        vii) directing the laser beam horizontally from the inclinometer to the target;
        viii) calculating the centroid of the laser beam projected up the target to determine the elevation of the floor at the end of the survey line; and ix) calculating the difference between the relative height of the floor at the beginning of the survey line and the end of the survey line;

b) performing a plurality of inclinometer measurements in one direction along the survey line;

c) using the elevation difference to correct offset errors in the inclinometer measurements; and d) wherein the use of the elevation difference to correct offset errors in the inclinometer measurements eliminates a need to perform inclinometer measurements in a reverse direction.

10. A method for measuring flatness of a floor with an inclinometer, said method comprising the steps of:

a) determining relative elevations of the floor at a beginning and end of a survey line to provide an elevation difference;

b) performing a plurality of inclinometer measurements in one direction along the survey line, the step of performing a plurality of inclinometer measurements comprising:
   i) moving the inclinometer forward approximately six inches along the survey line;
   ii) taking a plurality of the inclinometer measurements while continuing to move the inclinometer;
   iii) averaging the inclinometer measurements;
   iv) storing the average inclinometer measurement value; and
   v) repeating steps i) through iv) until the end of the survey line is reached;

c) using the elevation difference to correct offset errors in the inclinometer measurements; and d) wherein the use of the elevation difference to correct offset errors in the inclinometer measurements eliminates a need to perform inclinometer measurements in a reverse direction.

11. A method for measuring flatness of a floor with an inclinometer, said method comprising the steps of:

a) determining relative elevations of the floor at a beginning and end of a survey line to provide an elevation difference;

b) performing a plurality of inclinometer measurements in one direction along the survey line, the step of performing a plurality of inclinometer measurements comprising:
   i) moving the inclinometer forward approximately six inches along the survey line;
   ii) taking approximately sixteen inclinometer measurements while moving the inclinometer approximately one to one and one-half inches;
   iii) averaging the inclinometer measurements;
   iv) storing the average inclinometer measurement value; and
   v) repeating steps a) through d) until the end of the survey line is reached;

c) using the elevation difference to correct offset errors in the inclinometer measurements; and d) wherein the use of the elevation difference to correct offset errors in the inclinometer measurements eliminates the need to perform inclinometer measurements in a reverse direction.

12. A system for measuring flatness of a floor, said system comprising:

a) a self-propelled inclinometer configured to follow a survey line;

b) a laser source formed to said self-propelled inclinometer;

c) a target for sensing a vertical position of a laser beam incident thereon;

d) wherein said laser source generates a laser beam suitable for use in determining an elevation of the self-propelled inclinometer; and e) wherein relative elevations of said self-propelled inclinometer are measured by directing the laser beam from said self-propelled inclinometer to said target.

13. A system for measuring flatness of a floor, said device comprising:

a) a self-propelled inclinometer configured to follow a survey line;

b) a laser source formed to said self-propelled inclinometer;

c) a computer for determining the centroid of the laser beam incident upon said target so as to enhance accuracy of the relative elevation measurement; and d) wherein said laser source generates a laser beam suitable for use in determining an elevation of the self-propelled inclinometer.

14. A system for measuring flatness of a floor, said device comprising:

a) a self-propelled inclinometer configured to follow a survey line;

b) a laser source formed to said self-propelled inclinometer;

c) a target for sensing a vertical position of a laser beam incident thereon; and d) wherein said laser source generates a laser beam which is modulated so as to mitigate interference from extraneous light sources, and wherein relative elevations of said self-propelled inclinometer are measured by directing the laser beam from said self-propelled inclinometer to said target.

15. A system for measuring flatness of a floor, said device comprising:

a) a self-propelled inclinometer configured to follow a survey line;

b) a laser source formed to said self-propelled inclinometer;

c) a computer for determining the centroid of the laser beam incident upon said target so as to enhance accuracy of the relative elevation measurement; and d) wherein said laser source generates a laser beam which is modulated so as to mitigate interference from extraneous light sources.

* * * * *